United States Patent Office 2,697,808
Patented Dec. 21, 1954

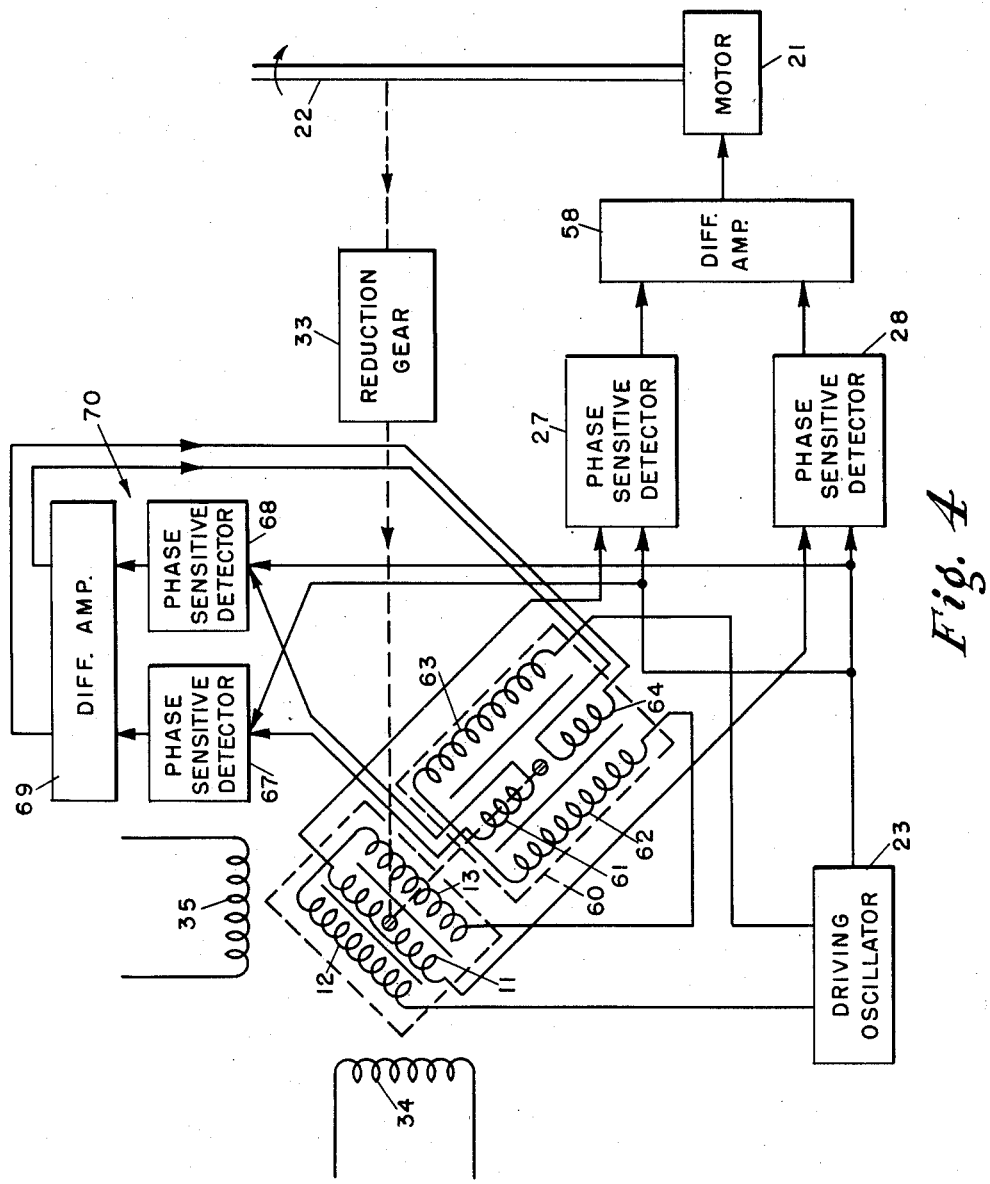

2,697,808

SERVO SYSTEM EMPLOYING DIRECT CURRENT RESOLVERS

Edward F. MacNichol, Jr., Hamilton, Mass., and Henri S. Sack and Richard N. Work, Ithaca, N. Y., assignors to the United States of America as represented by the Secretary of the Navy Application June 20, 1946, Serial No. 678,028

12 Claims. (Cl. 318—28)

The present invention relates to electrical resolvers, and more particularly to the use of specially designed and operated magnetic pick-up elements in a resolver structure, thereby permitting application of the resolver to direct current systems.

In communication engineering the resolver, often referred to as a synchro, plays an important role. One of its applications is the transmission of angular rotation from one place to another. This is achieved by two identical resolvers, one the transmitter, one the receiver, each having a stator of two windings perpendicular to one another and a rotor with a single winding. An alternating current is set up in the rotor of the transmitting resolver. Induced potentials are then established in the two stator windings which are proportional to the sine and cosine respectively of the angle which the rotor forms with one of the stator windings. These two signals are then transmitted to the receiver side and fed into the two stator windings of the identical receiving resolver. The currents through the two receiver stator windings establish a magnetic field, the orientation of which with respect to one of the receiver stator widings is the same as that of the transmitter rotor winding with respect to one of the transmitter stator windings. If the receiver rotor is oriented in such a way that the induction is zero, which means that the rotor winding is perpendicular to the resultant magnetic field, then the shaft rotation of this, the receiver rotor, is equal to the rotation of the rotor shaft of the transmitter. Another application of resolvers, which makes more apparent the given name, is that to the problem of coordinate transformations, or resolutions. For this purpose a resolver is used with two stator windings perpendicular to one another and with two rotor windings also perpendicular to each other. If two alternating potentials representing two rectangular coordinates are applied to the two stator windings, and further if the rotor is so oriented that the induction in one of its windings is zero (zero potential output), then the angle which this rotor winding forms with one of the stator windings is the angular coordinate of, and the potential output of the second rotor winding is proportional to the magnitude of, the radial coordinate which is the resultant of the two rectangular coordinates. These two specific applications are quoted for reference, but there are numerous other common applications of resolvers.

One difficulty which has been encountered with alternating current resolvers is that of producing accurate, linear modulators when it is necessary to operate from direct current input signals. Previous practice has been to generate direct current voltages proportional to the sine and cosine components of a given shaft rotation. These two generated direct current voltages were then introduced to two modulators which were meant to yield two alternating potentials proportional to the two input direct current voltages. One of these alternating potentials, representing the sine component of the shaft rotation, was impressed on one winding of a stator having two mutually perpendicular windings. The other of these two alternating potentials, representing the cosine component, was impressed on the other winding of the stator. The information represented by the two alternating potentials in the two stator windings was then resolved in the manner previously disclosed. Great difficulties were encountered in making modulators of sufficient linearity to yield accurate resolution. Furthermore, alternating current resolvers very often introduce phase shifts which require special correction circuits, and transmission of alternating potentials is subject to and causes interference.

It is known that the secondary output of a transformer with a ferromagnetic core having a conventional non-linear hysteresis curve contains only odd harmonics if the primary is excited by a pure sine wave. However, if a direct current magnetic field is superimposed on the core material, even harmonics will also appear in the secondary. The potential of each of these even harmonics is a direct measure of the intensity of the direct current magnetic field. The present invention contemplates the use of this fundamental concept in a direct current resolver having a rotor which yields even harmonic error signals for use in presenting rotational information.

Accordingly, it is an object of this invention to provide a voltage resolver.

It is a further object of this invention to provide a direct current resolver.

It is another object of this invention to provide a resolver which requires fewer correction circuits.

It is still another object of this invention to use a specially designed and operated pick-up element in a resolver structure, thereby permitting application of the resolver to direct current systems.

These and other and further objects of the present invention will become more readily apparent upon examination of the following description and the accompanying drawings of which:

Fig. 3 is a schematic wiring diagram of the embodiment of Fig. 2; and

Fig. 4 is a block diagram, similar to that shown in Fig. 2, of an embodiment of this invention showing the use of a direct current resolver for transformation of rectangular into polar coordinates.

Figure 1:
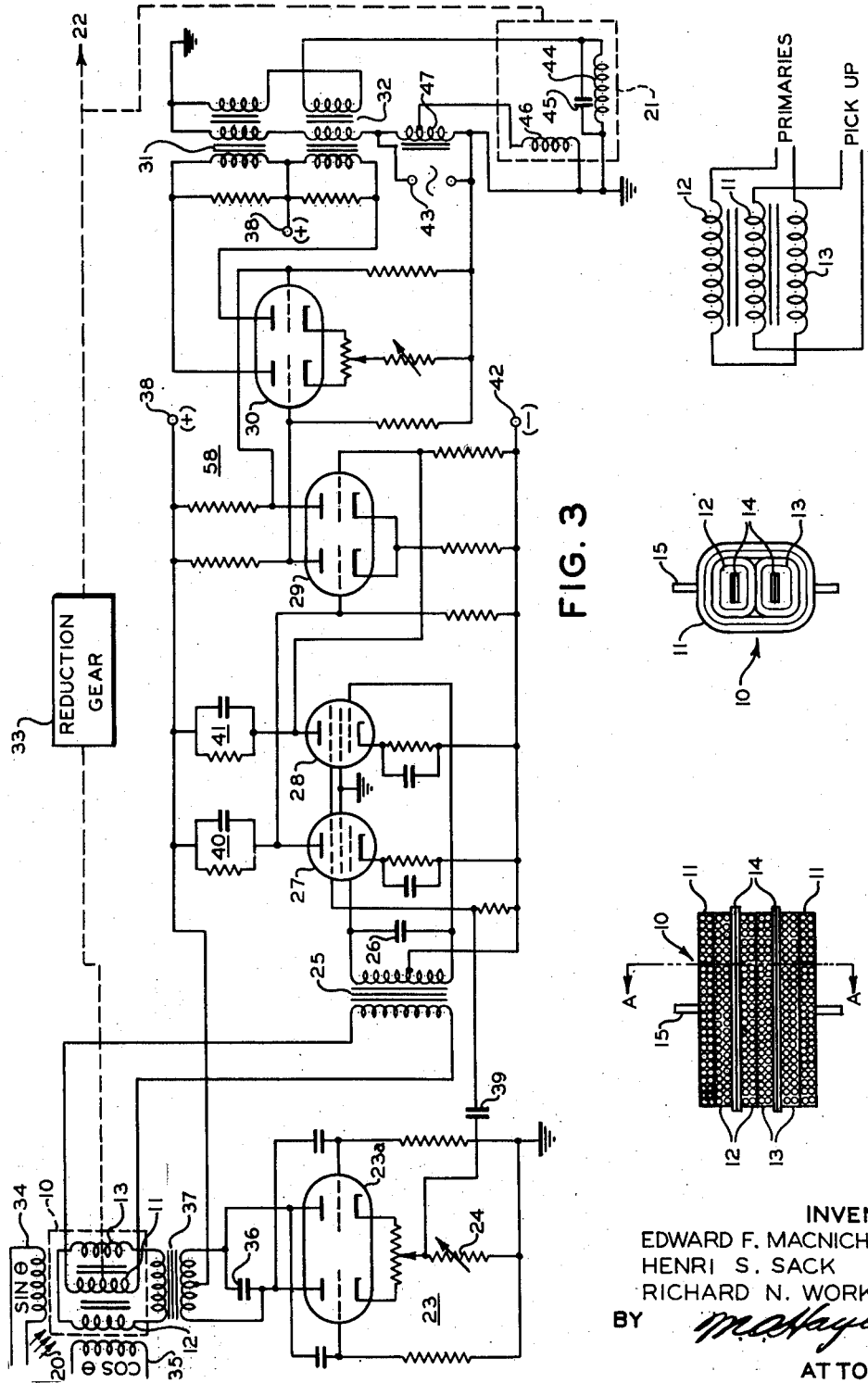
Fig. 1A is a sectional view of a magnetic pickup element to be used as the rotor of a direct current resolver.
Fig. 1B is a sectional view along the line A—A of the pickup element of Fig. 1A.
Fig. 1C is a schematic wiring diagram of the windings of the pickup element of Fig. 1A.

In detail, Figs. 1A and 1B show the juxtaposition of pickup coil 11 and primary windings 12 and 13 of rotor 10. The core material comprises two laminations 14 which, in this embodiment, are made of a material with a very steep hysteresis curve to give increased sensitivity of the device. The structure of windings 11, 12 and 13 and core laminations 14 is supported by a shaft 15 which is perpendicular to the plane of the laminations.

Fig. 1C illustrates the electrical connections of primary windings 12 and 13 and secondary winding 11. The two primary windings 12 and 13 are wound on laminations 14 and are connected in phase opposition so that any fundamental alternating magnetic field resulting from an alternating voltage impressed across windings 12 and 13 will be effectively removed for secondary winding 11. Thus, until this element is brought into a direct current magnetic field none of the alternating potential impressed on windings 12 and 13 will be induced in winding 11. However, the subjection of this element to a direct magnetizing field introduces an asymmetry in the hysteresis curve and thus causes even harmonics of this fundamental frequency to be induced in secondary winding 11. Appropriate means have been developed which accept the second harmonic frequency output of winding 11 and by proper employment thereof effectively orient rotor 10, and perforce secondary winding 11, in such fashion that secondary winding 11 is perpendicular to the direct current magnetic field, the second harmonic output being zero as a consequence. It is, of course, possible to use other similar pick-up elements, based on the same principle; but with different arrangement and number of windings, as it will be apparent to those skilled in the art.

Figure 2:
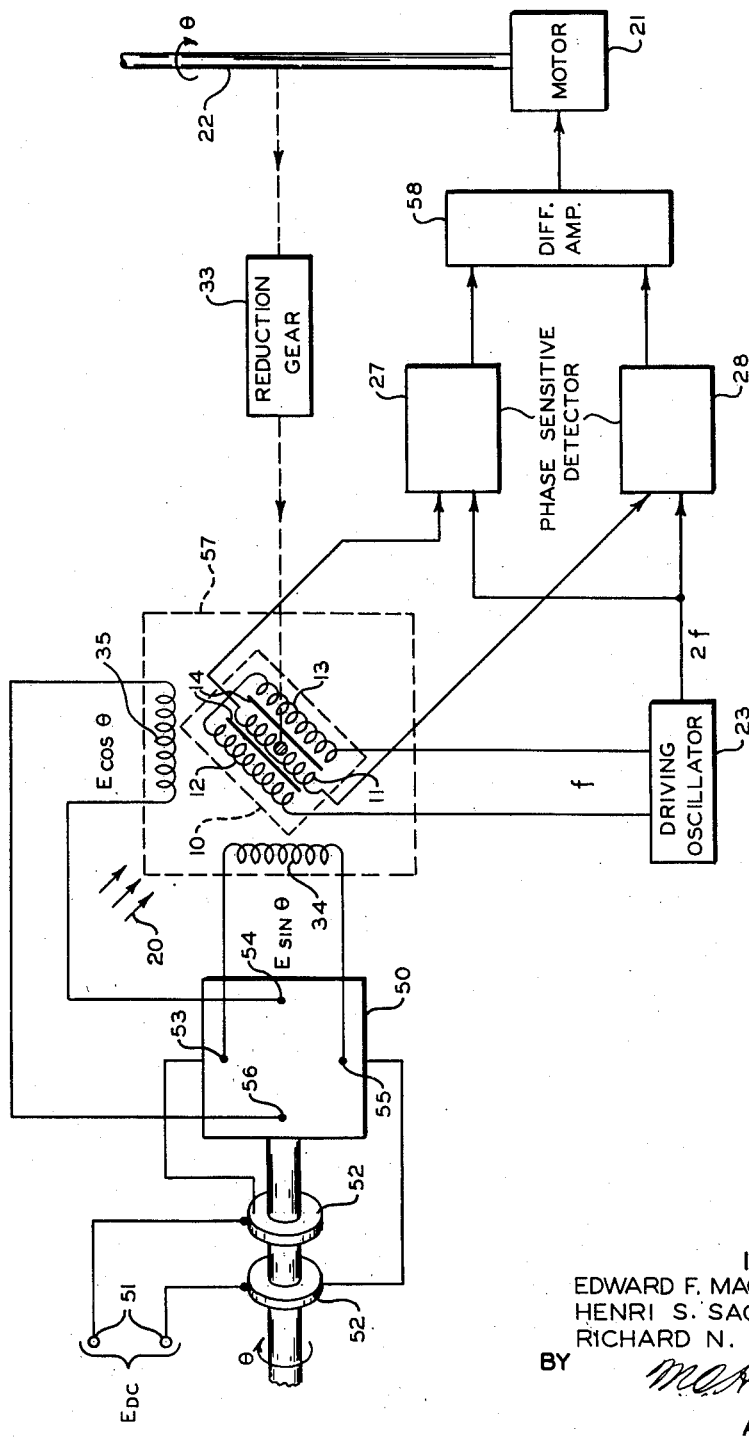
Fig. 2 is a block diagram of an embodiment of this invention in the form of a direct current resolver.

A complete system incorporating rotor 10 as a magnetic pickup element and means for detecting and measuring the second harmonic frequency content of secondary winding 11 of rotor 10 is disclosed in a schematic-block diagram in Fig. 2 and reference is now made thereto. In the left-hand portion of the drawing is shown a sine potentiometer which is one method of producing direct voltages which represent components of rotation. Other methods, depending upon the applications, are used to produce these voltages, but the sine potentiometer is used as a convenient illustration. A direct voltage is applied at terminals 51, is fed through slip rings 52 to sine potentiometer 50 which is rotatable and connected to the shaft whose rotation it is desired to duplicate. Four brushes, 53, 54, 55 and 56 are so arranged in contact with potentiometer 50 that a voltage representing the product of the impressed voltage E and the sine of the angle $\theta$ appears across brushes 53 and 55, whereas a voltage representing E cosine $\theta$ appears across brushes 54 and 56. The direct voltages proportional to the sine and cosine respectively of the angle of rotation which is to be reproduced by the invented device are fed to the two stator windings 34 and 35 of direct current resolver 57. Primary windings 12 and 13 of rotor 10 are excited by an alternating potential from a driving oscillator 23. In accordance with the principles previously expounded a second harmonic of the driving oscillator frequency will be induced in secondary winding 11. This second harmonic voltage is fed to a phase sensitive detector having in the example given, two tubes represented by blocks 27 and 28. A comparison voltage at the second harmonic frequency is connected to this phase-sensitive detector from driving oscillator 23 as shown. The output of the phase sensitive detector is fed to a differential amplifier 58. Amplifier 58, through suitable circuits, drives a motor 21. Motor 21 drives an output shaft 22 and, through a reduction gear 33, rotor 10. The circuit is so connected that motor 21 is caused to rotate in such a way as to cause rotor 10 to assume a position wherein the plane of core laminations 14 is perpendicular to the magnetic field represented by arrows 20 and established by windings 34 and 35. This action nullifies the second harmonic output of winding 11 and causes the whole system to reach an equilibrium. The conditions of this equilibrium are that output shaft 22 has moved through the angle $\theta$, the angle represented by the input potentials. This structure as disclosed then comprises a system which will reproduce the rotation of a shaft.

The circuits which perform the above-mentioned operations are shown in more detail in Fig. 3. The rotor 10 is shown subjected to the direct current magnetic field represented by arrows 20. Field 20 is established by two mutually perpendicular windings 34 and 35 of the stator of direct current resolver 57 as in Fig. 2. Winding 34 receives a direct voltage which represents the sine component of the shaft rotation, $\theta$, which it is desired to duplicate; winding 35 receives a direct voltage which represents the cosine component of this rotation. Primary windings 12 and 13 are excited by an alternating potential from oscillator 23 which will be more explicitly described hereinafter. In accordance with the aforementioned concepts subjection of rotor 10 to direct current magnetic field 20 causes even harmonics of the fundamental frequency of oscillator 23 to be induced in secondary winding 11. The output of winding 11 is fed to a circuit which is tuned to the second harmonic frequency of oscillator 23. This circuit, in a manner which will be explicitly described in conjunction with the description of oscillator 23, causes the rotor of low inertia induction motor 21 to move. Motor 21 drives output shaft 22 and, through reduction gear 33, the shaft of rotor 10. The circuit is so arranged that motor 21 tends to move rotor 10 in the direction of decreasing second harmonic content, that is, a direction such that the core of rotor 10 will be effectively perpendicular to direct current magnetic field 20. This structure, then, comprises a system of the nature of that structure previously disclosed in Fig. 2 which will reproduce the rotation of a shaft the sine $\theta$ and cos $\theta$ direct voltage components of whose rotation are impressed on stator windings 34 and 35.

A more explicit description will now be given of the electronic features of this embodiment and continued reference is made to Fig. 3. Oscillator 23 comprises a basic multivibrator circuit around a double triode 23 which has incorporated in its plate circuit a tuned circuit. This tuned circuit comprises a capacitor 36 and a center tapped transformer 37, the center tap of which is returned to a positive source of voltage connected at 38. The addition of this tuned circuit causes the output of oscillator 23 to be essentially a sine wave. The output of the oscillator is coupled to primary windings 12 and 13 of rotor 10 through the primary and secondary windings of transformer 37. The circuit of oscillator 23 also has a variable resistor 24 which enables control over the magnitude of the potential exciting windings 12 and 13. Sensitivity and stability have been found to be best when the voltage impressed on primary windings 12 and 13 is such that the core formed by laminations 14 is magnetized just beyond saturation. The output of secondary winding 11 is fed to a transformer 25 where the potential is stepped up. The secondary of transformer 25 is tuned to the second harmonic frequency of oscillator 23 with the aid of capacitor 26. Tuning is important since it increases sensitivity, but too sharp tuning is to be avoided, since instability may occur as well as a too great sensitivity to change of the frequency of oscillator 23. The secondary of transformer 25 is connected to the two control grids of two pentodes 27 and 28 which form the phase sensitive detector. A reference alternating potential from the cathode circuit of oscillator 23 which is a second harmonic of the output frequency is connected through a capacitor 39 to the suppressor grids of pentodes 27 and 28. Thus, if a positive signal is impressed on the control grid of pentode 27 at the same time the reference potential on the suppressor grid is positive, that is, in phase, pentode 27 will conduct more heavily than pentode 28 whose control grid is negative. The plate potential of each pentode is averaged out by a filter network; networks 40 and 41 for tubes 27 and 28 respectively. The average plate potential of pentode 27 is then lower than that of pentode 28. It is readily seen that the plate potential of pentode 28 will be lower than that of pentode 27 if the signal from transformer 25 changes in phase. This signal will change phase when rotor 10 is rotated in such fashion that the core smoothly approaches a direction perpendicular to magnetic field 20, attains it, and recedes from it. Thus pentodes 27 and 28 constitute a phase sensitive detector which will yield an output which has directional sense. The two plate potentials are direct-coupled to the grids of a twin triode 29 which has a common cathode resistor and individual plate resistors. The grids and the cathode are returned through suitable resistors to a negative source of voltage connected at 42. Accordingly this last circuit constitutes a differential amplifier which by reason of the common cathode resistor will accentuate, that is, effectively amplify, the difference in potential between the two control grids. The two plate potentials of differential amplifier triode 29 are direct-coupled to the grids of a twin triode 30 which constitutes a second differential amplifier, the two triodes 29 and 30 comprising differential amplifier 58 of Fig. 2. In the plate circuits of twin triode 30, however, there are two primary windings of two saturable transformers 31 and 32. These primary windings are connected to a positive source of voltage connected at 38 and to the plates of twin triode 30. The secondary windings of transformers 31 and 32 are connected in series between an alternating source of voltage connected at 43 and ground. The tertiary windings of transformers 31 and 32 are connected in phase opposition and between ground and a winding 44 of low inertia induction motor 21. Winding 44 has a capacitor 45 across it to provide the necessary 90 degrees phase shift. The other winding 46 of motor 21 is connected to an auto transformer 47 which is excited by the alternating potential connected at 43. The operation of motor 21 is initiated in the following manner. The difference in the grid potentials of twin triode 30 causes different direct currents to flow in the primary windings of transformers 31 and 32. These different direct currents cause the cores of transformers 31 and 32 to be saturated to different degrees, and hence they will have unequal transformer characteristics. As a result the two voltages in the phase opposed tertiary windings will no longer completely cancel and a net voltage will appear across winding 44 of motor 21. If the opposite transformer core is the more saturated, the other tertiary winding will have control and the voltage impressed on winding 44 will be of opposite phase. This will cause motor 21 to rotate in the opposite direction. Thus this circuit structure provides one means of constructing a direct current resolver. It is to be understood, however, that the particular oscillator, amplifiers, and motor circuit have been described as examples only, for any suitable alternating source and accompanying amplification and motor circuit might be employed.

As previously mentioned, a further application of a D. C. resolver is the transformation of rectangular into polar coordinates. To perform this operation it is necessary to add to the system hereinbefore disclosed a second pick-up element 60 mounted on the same shaft perpendicular to the one used to perform the shaft rotation follow-up function. This second pick-up element is similar to the one described except that an additional compensation winding 64 is added. The shaft on which the elements are mounted will be oriented by the first pick-up element in such a way that said pick-up element is always perpendicular to the magnetic field created by the stator. The newly added second pick-up element, then, will be oriented exactly in the direction of the magnetic field. To measure the intensity of the magnetic field produced by the stator a feedback system 70, comprising phase sensitive detector 67 and 68 and differential amplifier 69, similar to those previously described, is used, wherein a current is introduced and regulated in the compensation winding of the second pick-up element, such that the magnetic field produced by the current just compensates the magnetic field created by the currents in the stator windings. The primaries 12, 13, 62, and 63 of the two pick-up elements are connected in series and are energized from the same source 23 of alternating potential. The second harmonic output of the first element is treated as previously described to cause operation of a motor which will position the shaft such that the element will be perpendicular to the field created by the stator. Since the second element is also subjected to the magnetic field of the stator, a second harmonic output will also appear across its secondary winding 61. This output is also amplified and phase detected by a so-called feedback circuit, the output of the feedback circuit being applied to the compensation windings on the pick-up element. Such a feedback circuit is fully discussed in copending application Serial No. 679,596 filed June 27, 1946 by Henri S. Sack, Bruno Rossi, Glenn H. Miller, and Robert T. Beyer. This type of feedback arrangement provides an automatic adjustment of the compensation current as will be evident from the following reasoning. If the feedback current is too high due to improper positioning of the first pick-up element, the second harmonic output of the first pick-up element will be different from zero and have a certain phase; and if the connections are made in the proper way, the amplifier and torque unit will position the shaft on which the elements are mounted such that the feedback current is decreased. Similarly, if the feedback current is too small, the phase of the output from the first pick-up element will be different by 180 degrees, which condition will cause the torque unit to be operative in the opposite direction until the output from said element again becomes zero, causing the feedback current in the second element to increase. By this process of self-compensation, the rotor is always positioned such that the first element is perpendicular to the field created by the stator, and the feedback current is maintained at a value which is directly proportional to the magnitude of the magnetic field created by the resolver stator. The first pick-up element, then, serves as a zero position indicator, and the second element is used to measure the intensity of the magnetic field.

Accordingly, while the foregoing description has presented an explanation of this invention in the particular application of a direct current resolver, the principles of this invention are of broader application in ways which will be apparent to those versed in the art. For example, it is possible to replace tube 30 and the associated torque unit by a split field direct current motor having a preamplifier. Also, the phase-sensitive detector herein disclosed may well be replaced by other types disclosed in copending application Serial No. 684,051 filed July 16, 1946 by Henri S. Sack and Glenn H. Miller. Similarly, the complete detecting and motor system may be replaced by an A. C. amplifier and phase sensitive motor. It will therefore be understood that the above-disclosed embodiment is primarily illustrative and the invention includes such other embodiments as fairly fall within the spirit and scope of the appended claims.

What is claimed is:

1. A coordinate transformation system comprising, a stator having two mutually perpendicular windings providing when energized a magnetic field in a predetermined direction, a rotor comprising first and second transformers positioned within said magnetic field, the axes of said first and second transformers being mutually perpendicular, said first transformer having a primary and a secondary winding, said second transformer having a primary, a secondary, and a compensation winding, means for applying an alternating potential to said primary windings connected in series, a first phase-sensitive detector adapted to detect the output of said secondary winding of said first transformer, a differential amplifier fed by said phase-sensitive detector, a torque unit activated by said differential amplifier, a mechanical connection between said torque unit and said rotor, said torque unit being operative to rotate said rotor through an angle whose sine and cosine components are effectively expressed by the magnitude of the currents passing through said two stator windings, a second phase-sensitive detecor adapted to detect the output of said secondary winding of said second transformer, a differential amplifier fed by said phase-sensitive detector, the output of said amplifier being applied to said compensation winding of said second transformer, whereby the current in said compensation winding is proportional to the magnitude of said magnetic field.

2. A direct current follow-up system comprising, in combination, means for establishing a direct magnetic field in a direction indicative of the rotational position of a first rotatable element, two permeable cores positioned for rotation in said magnetic field, said cores having serially connected excitation windings and a secondary winding, a source of alternating current connected to said excitation windings, means connected to said secondary winding for producing a pair of direct current voltages of polarity and intensity proportional to the direction of said magnetic field, means operative in response to said pair of voltages for rotating a second rotatable element and a mechanical connection between said second element and said rotatable cores for rotating said cores to a position where the output of said secondary winding is reduced to zero.

3. A direct current follow-up system comprising, in combination, means responsive to the rotation of a first rotatable element for establishing a direct magnetic field having a direction indicative of the rotational position of said element, two saturable cores positioned for rotation in said magnetic field, said cores having serially connected excitation windings and a secondary winding, an oscillator connected to said excitation winding, a phase sensitive detector connected to said secondary winding and operative in response to a double frequency signal from said oscillator to produce a pair of direct current voltages of polarity and intensity proportional to the direction of said magnetic field, means operative in response to said pair of voltages for rotating a second rotatable element in synchronism with said first element and a mechanical connection between said second element and said rotatable cores for positioning said cores for zero output from said secondary winding.

4. A direct current follow-up system comprising, in combination, means responsive to the rotation of a first rotatable element for establishing a direct magnetic field having a direction indicative of the rotational position of said element, two saturable cores positioned for rotation in said magnetic field, said cores having serially connected excitation windings and a secondary winding, an oscillator connected to said excitation winding, a phase-sensitive indicator connected to said secondary winding and operative in response to a double frequency signal from said oscillator to produce a pair of direct current voltages of polarity and intensity proportional to the direction of said magnetic field, means for differentially amplifying said pair of voltages, a motor operative in response to said pair of voltages to rotate a second rotatable element in a direction dependent on the relative magnitudes and polarities of said pair of voltages and a mechanical connection between said second element and said rotatable cores for positioning said cores for zero output from said secondary winding.

5. A direct current follow-up system for providing synchronous rotation of first and second rotatable elements comprising, in combination, means responsive to the rotation of said first element for establishing a direct magnetic field in a direction indicative of the rotational position of said first element, a rotatable transformer positioned for rotation in said magnetic field, said transformer comprising a pair of saturable cores having serially connected excitation windings and a pick-up winding, a source of alternating current connected to said excitation windings, a phase-sensitive detector connected to said pick-up winding for detecting the even harmonics of said alternating current induced in said pick-up winding, the intensity and phase of which are dependent on the intensity and direction of said magnetic field relative to the orientation of said transformer, a phase-sensitive motor operable in response to the output of said phase-sensitive detector for driving said second element, and means connected between said second element and said transformer for rotating said transformer to reduce the output therefrom to zero.

6. A rotation transmission system comprising, in combination, means for generating a pair of quadrature sinusoidally varying voltages in response to the rotation of a first shaft, a stator having two mutually perpendicular windings, means for respectively applying said quadrature voltages to said stator windings thereby producing a rotatable direct magnetic field, a rotatable rotor positioned within said magnetic field, said rotor comprising a pair of saturable cores having serially connected excitation windings and a secondary winding, a source of alternating current connected to said excitation windings, a phase-sensitive detector connected to said secondary winding, a phase-sensitive motor operable in response to the output of said phase-sensitive detector for driving a second shaft, and a mechanical connection between said second shaft and said rotor, said system being operable to rotate said second shaft in synchronism with said first shaft.

7. Direct current apparatus for causing an output shaft to rotate in synchronism with an input shaft comprising, means coupled to said input shaft for establishing a direct magnetic field, the direction of which rotates in synchronism with the rotation of said input shaft, a pair of saturable cores positioned for rotation in said magnetic field, said cores having serially connected excitation windings and a secondary winding, an oscillator connected to said excitation windings, means responsive to the intensity and phase of the even harmonics of said oscillator frequency appearing across said secondary winding for driving said output shaft, and a mechanical connection between said output shaft and said rotatable cores for positioning said cores such that the output of said secondary winding is zero.

8. Direct current apparatus for causing an output shaft to rotate in synchronism with an input shaft comprising, means coupled to said input shaft for establishing a direct magnetic field, the direction of which rotates in synchronism with the rotation of said input shaft, a pair of saturable cores positioned for rotation in said magnetic field, said cores having serially connected excitation windings and a secondary winding, an oscillator connected to said excitation windings, a phase-sensitive detector connected to said secondary winding and operable in response to a double frequency signal from said oscillator to produce a pair of direct current voltages of polarity and intensity proportional to the direction of said magnetic field, means operable in response to said pair of voltages for rotating said output shaft in synchronism with said input shaft, and mechanical connection between said output shaft and said rotatable cores for positioning said cores for zero output from said secondary winding.

9. Direct current apparatus for causing an output shaft to rotate in synchronism with an input shaft comprising, a stator having a plurality of windings spaced in a predetermined manner, means operative in response to the rotation of said input shaft for energizing said plurality of windings for producing a direct magnetic field, the direction of which changes in correspondence with the rotation of said input shaft, a rotor comprising a pair of saturable cores mounted for rotation relative to said plurality of stator windings, said cores having serially connected excitation windings and a secondary winding, an oscillator connected to said excitation winding, means responsive to the intensity and phase of the even harmonics of said oscillator frequency appearing across said secondary winding for rotating said output shaft, and a mechanical connection between said output shaft and said rotor for positioning said cores such that the output of said secondary winding is zero.

10. Direct current apparatus for causing an output shaft to rotate in synchronism with an input shaft comprising, a stator having a plurality of windings spaced in a predetermined manner, means operative in response to the rotation of said input shaft for energizing said plurality of windings for producing a direct magnetic field, the direction of which changes in correspondence with the rotation of said input shaft, a rotor comprising a pair of saturable cores mounted for rotation relative to said plurality of stator windings, said cores having serially connected excitation windings and a secondary winding, an oscillator connected to said excitation winding, a phase-sensitive detector connected to said secondary winding and operable in response to a double frequency signal from said oscillator to produce a pair of direct current voltages of polarity and intensity indicative of the direction of said magnetic field, means operable in response to said pair of voltages for rotating said output shaft, and a mechanical connection between said output shaft and said rotor for positioning said cores for zero output from said secondary winding.

11. Direct current apparatus for causing an output shaft to rotate in correspondence with an input shaft, a source of direct current potential, a sine wave potentiometer having a plurality of output terminals and a rotatable element coupled to said input shaft, a stator having a plurality of field windings, means connecting the output terminals of said potentiometer to said field windings, said potentiometer when energized by said direct current source energizing said field windings to produce a direct magnetic field, the direction of which changes in correspondence with the rotation of said input shaft, a rotor comprising a pair of saturable cores mounted for rotation relative to said stator, said cores having serially connected excitation windings and a secondary winding, an oscillator connected to said excitation winding, means responsive to the intensity and phase of the even harmonics of said oscillator frequency appearing across said secondary winding for driving said output shaft, and a mechanical connection between said output shaft and said rotor for positioning said cores such that the output of said secondary winding is zero.

12. Direct current apparatus for causing an output shaft to rotate in correspondence with an input shaft, a source of direct current potential, a sine wave potentiometer having a plurality of output terminals and a rotatable element coupled to said input shaft, a stator having a plurality of field windings, means connecting the output terminals of said potentiometer to said field windings, said potentiometer when energized from direct current source energizing said field windings to produce a direct magnetic field, the direction of which changes in correspondence with the rotation of said input shaft, a rotor comprising a pair of saturable cores mounted for rotation relative to said stator, said cores having serially connected excitation windings and a secondary winding, an oscillator connected to said excitation winding, a phase-sensitive detector connected to said secondary winding and operable in response to a double frequency signal from said oscillator to produce a pair of direct current voltages of polarity and intensity indicative of the direction of said magnetic field, means operable in response to said pair of voltages for rotating said output shaft, and a mechanical connection between said output shaft and said rotor for positioning said cores for zero output from said secondary winding.

References Cited in the file of this patent

UNITED STATES PATENTS

| Number | Name | Date |
|---|---|---|
| 2,047,609 | Antranikian | July 14, 1936 |
| 2,053,154 | La Pierre | Sept. 1, 1936 |
| 2,376,883 | Riggs et al. | May 29, 1945 |
| 2,420,580 | Antes | May 13, 1947 |
| 2,425,180 | Fay | Aug. 5, 1947 |

OTHER REFERENCES

Transactions Section "Electrical Engineering," November 1944, pp. 857–860.